United States Patent [19]

Suess et al.

[11] Patent Number: 5,383,687
[45] Date of Patent: Jan. 24, 1995

[54] VALUE DOCUMENT AND EMBOSSING FOIL FOR THE PRODUCTION THEREOF

[75] Inventors: Joachim Suess, Fuerth; Hubert Suessner, Oberasbach, both of Germany

[73] Assignee: Leonhard Kurz GmbH & Co., Fuerth, Germany

[21] Appl. No.: 17,015

[22] Filed: Feb. 12, 1993

[30] Foreign Application Priority Data

Feb. 29, 1992 [DE] Germany .............................. 4206441

[51] Int. Cl.⁶ .......................... B42D 15/10; B32B 3/00
[52] U.S. Cl. ...................................... 283/86; 283/107; 283/904; 428/172; 428/201; 428/207; 428/209; 428/692; 428/915; 428/916; 428/913
[58] Field of Search .................... 283/86, 107, 904; 428/172, 201, 207, 209, 692, 913, 914, 915, 916

[56] References Cited

U.S. PATENT DOCUMENTS

| | | |
|---|---|---|
| 4,376,006 | 3/1983 | Nishikawa et al. . |
| 4,497,872 | 2/1985 | Hoppe et al. ............... 283/107 X |
| 4,631,222 | 12/1986 | Sander . |
| 4,684,795 | 8/1987 | Colgate, Jr. . |
| 4,728,377 | 3/1988 | Gallagher ................ 283/904 X |
| 4,856,857 | 8/1989 | Takeuchi et al. ............ 283/86 X |
| 4,971,646 | 11/1990 | Schnell et al. ............. 283/86 X |
| 5,267,755 | 12/1993 | Yamauchi et al. ............ 283/86 |

FOREIGN PATENT DOCUMENTS

| | | |
|---|---|---|
| 3422910 | 9/1985 | Germany . |
| 3138559 | 10/1989 | Germany . |
| 3317943 | 12/1988 | Japan ....................... 283/904 |
| 1214488 | 8/1989 | Japan ....................... 283/904 |
| 3118198 | 5/1991 | Japan ....................... 283/107 |

*Primary Examiner*—Frances Han
*Attorney, Agent, or Firm*—Louis E. Marn

[57] ABSTRACT

A value document and an embossing foil for the production thereof comprise a security feature in the form of a combination of a magnetic layer and a security layer which has an optical-diffraction effect. The security layer structure that has the optical-diffraction effect is provided with a reflective metal layer. To prevent damage to the reflective metal layer by particles of the magnetic layer, the metal layer is made of suitably resistant metal and/or a barrier layer is provided between the metal layer and the magnetic layer.

21 Claims, 1 Drawing Sheet

VALUE DOCUMENT AND EMBOSSING FOIL FOR THE PRODUCTION THEREOF

BACKGROUND OF THE INVENTION

The present invention generally concerns value documents.

In this specification the term value documents, as the term implies, are documents which involve a value of some nature, for example bank notes, credit cards, passes, or tickets.

One form of value document, as is to be found for example in U.S. Pat. No. 4,684,795, carries, on at least one of its surfaces, a security feature or element which on the one hard includes a magnetic layer comprising a dispersion of magnetisable particles in a binder and on the other hand a security layer which has an optical-diffraction effect, for example a hologram or a computer-generated diffraction layer, an interference layer or a diffraction grating. In that document the security layer is superimposed on the magnetic layer at least in a region-wise manner thereon while the surface of the security layer which is towards the magnetic layer has a spatial structure with an optical-diffraction effect. The security layer is further provided with a reflective non-magnetisable metal layer.

The present invention also concerns embossing foils and more particularly but not exclusively hot embossing foils as may preferably be used for the production of value documents of the kind indicated above. Such an embossing foil may typically comprise a backing film and a transfer layer which is releasable therefrom and which, starting from the backing film, comprises at least one security layer in the form of a transparent lacquer layer with an optical-diffraction effect and which includes a spatial structure with an optical-diffraction effect at its surface remote from the backing film, a reflective metal layer which is disposed on the spatial structure of the security layer, a magnetic layer comprising a dispersion of magnetisable particles in a binder, and a bonding or adhesive layer which serves for fixing the transfer layer to a substrate and which is possibly formed by the magnetic layer or is combined therewith. Above-mentioned U.S. Pat. No. 4,684,795 also described the principles of producing such a value document by means of an embossing foil, while a detailed description of suitable embossing foils with a magnetic layer and a security layer having an optical-diffraction effect is to be found in DE 34 22 910 C1.

Hitherto, the production of value documents or hot embossing foils of that kind generally involved a procedure in which the reflective metal layer which serves to clearly show the structure with the optical-diffraction effect and which is applied to the correspondingly patterned surface of the security layer is formed by aluminium or aluminium alloy applied by vapor deposition in a vacuum. However under some circumstances the use of aluminium for the reflective metal layer can give rise to major problems, in particular when the value document in question is to be used in a humid atmosphere. More particularly, it has been found in some circumstances in such a situation that the aluminium layer is damaged or destroyed at at least some spots thereon or changes at least in regard to its appearance, for example by becoming discolored. That can result in the proper functioning of the security feature being adversely affected. That becomes apparent in particular when the structure of the security layer, which has an optical-diffraction effect, is a machine-readable structure, for example a hologram or a computer-generated diffraction structure.

Investigations have shown that the destruction of or damage to the aluminium layer on the document is probably to be attributed to the fact that the magnetisable particles of the magnetic layer, which in fact are usually iron oxides in different degrees of oxidation, react with the aluminium of the reflective metal layer, triggering off corrosion of the aluminium. The precise mechanism involved in that reaction is not known. It is suspected that the damage is to be attributed to the fact that the iron oxide pigments which are used as the magnetisable particles act as proton donors, another factor being the consideration that the iron oxide pigments used have pH-values in a range of between 3.0 and 5.5. In that case, under some circumstances, local elements can be formed between the magnetisable particles on the one hand and the aluminium serving as the reflective metal layer on the other hand, with corresponding damage to the aluminium layer.

SUMMARY OF THE INVENTION

An object of the present invention is to provide a value document, in relation to which the previously observed problems concerning damage to or changes in the reflective metal layer as a result of the magnetisable particles having an effect on the reflective metal layer can be at least substantially reduced.

Another object of the present invention is to provide an improved value document such that its original properties in regard to the reflective metal layer thereof remain unaltered to the maximum reasonable degree.

Still another object of the present invention is to provide an embossing foil such as a hot embossing foil for the production of a value document which retains its original properties in regard to the reflective metal layer thereof.

In accordance with the present invention, the foregoing and other objects are achieved by a value document such as a bank note, credit card, pass or ticket, which at at least one of its surfaces carries a security element which on the one hand includes a magnetic layer comprising a dispersion of magnetisable particles in a binder and on the other hand a security layer with an optical-diffraction effect, for example a hologram, a computer-generated diffraction layer, an interference layer or a diffraction grating. The security layer is superimposed on the magnetic layer at least in a region-wise manner while the surface of the security layer which is towards the magnetic layer has a spatial structure with an optical-diffraction effect, and is provided with a reflective non-magnetisable metal layer thereon. The metal layer is formed by a metal which does not react with the magnetisable particles of the magnetic layer and/or disposed between the metal layer and the magnetic layer is a barrier layer for preventing the magnetisable particles from having an action on the metal layer.

It will be noted here in this connection that when mention is made of the fact that the magnetisable particles are not to react with the metal forming the reflective metal layer, that does not mean just the exclusion of a chemical reaction in the true sense. The aim is also to prevent the occurrence of physical/chemical reactions such as the formation of local elements or the occurrence of other phenomena which could cause destruction of or damage to the metal layer.

It will be seen therefore that the invention involves two configurations which may be used separately or in combination to at least restrict the above-mentioned reactions, namely on the one hand using a special metal for the reflective layer, which metal has sufficient resistance to corresponding influences exerted by the iron oxide particles of the magnetic layer, being therefore really acid-resistant or not forming any local elements with such pigments. On the other hand, the magnetisable particles of the magnetic layer can be prevented from having an influence on the reflective metal layer by the provision of an additional barrier layer between the metal layer and the magnetic layer. Such a barrier layer, when the value document according to the invention is produced by the use of an embossing foil, can usually be formed by a suitable layer of lacquer.

As indicated above, it will be appreciated that it is possible to adopt both the above-discussed configurations, namely the use of a special metal and also the additional provision of the barrier layer.

In accordance with a preferred feature of the invention, the metal layer may be formed from chromium, copper, silver, gold or an alloy comprising at least two of those metals.

In accordance with another preferred feature of the invention, the barrier layer may comprise a layer of at least one organic polymer to which at least inorganic pigment is added. The polymers used may be for example high-molecular acrylic resins, polyvinylidene chloride PVC, PVC-copolymers, chlorinated rubber, polyester, and silicone-modified binder. The inorganic pigments used may be for example silicates and/or titanium dioxide. A barrier layer of such a composition forms a reliable buffer or a reliable adsorber medium at any event in relation to protons so that migration thereof through the barrier layer and corresponding damage to the metal layer are reliably prevented.

In accordance with another preferred feature of the invention, the barrier layer may be of a pH-value of $\geq 7$. That reliably prevents passage of protons.

In accordance with still another preferred feature of the invention, it has proven to be sufficient for the purposes of the invention if the barrier layer is of a thickness of between 0.5 and 5 $\mu m$, preferably between 2 and 3 $\mu m$. That thickness is sufficient on the one hand for reliably safeguarding the reflective layer, relative to the magnetisable particles of the magnetic layer. On the other hand, when the barrier layer is of such a small thickness, there is little likelihood of the readability of the data stored in the magnetic layer being adversely affected in any fashion.

In accordance with another aspect of the invention, the foregoing and other objects are attained by an embossing foil such as a hot embossing foil, preferably for the production of a value document in accordance with the invention as set forth above, comprising a backing film and a transfer layer which is releasable therefrom and which, starting from the backing film, comprises a security layer in the form of at least one transparent lacquer layer which has an optical-diffraction effect and which, at its surface remote from the backing film, has a spatial structure with an optical-diffraction effect, a reflective metal layer disposed on the spatial structure of the security layer, a magnetic layer comprising a dispersion of magnetisable particles in a binder, and an adhesive layer which serves for fixing to a substrate and which is possibly formed by the magnetic layer or is combined with the magnetic layer. The metal layer is formed by a metal which does not react with the magnetisable particles of the magnetic layer and/or disposed between the metal layer and the magnetic layer is a barrier layer for preventing the magnetisable particles from having an effect on the metal layer. It will be appreciated in this respect that, in an embossing foil according to the invention, disposed between the metal layer and the magnetic layer or the barrier layer and immediately adjoining the metal layer is a bonding layer which provides that the metal layer is reliably bonded to the magnetic layer or the barrier layer respectively. Normally a bonding layer does not suffice as a barrier layer. It is however possible for the barrier layer to be so selected and to be of such a composition that it can serve at the same time as a bonding layer, although in that respect problems may possibly occur as a result of the relatively strong pigmentation of the barrier layer.

Further objects, features and advantages of the present invention will be apparent from the following description of embodiments of a value document in the form of a credit card provided with a security feature according to the invention, and an embossing foil for the production of a value document.

DESCRIPTION OF THE PREFERRED EMBODIMENTS

Figure 1:
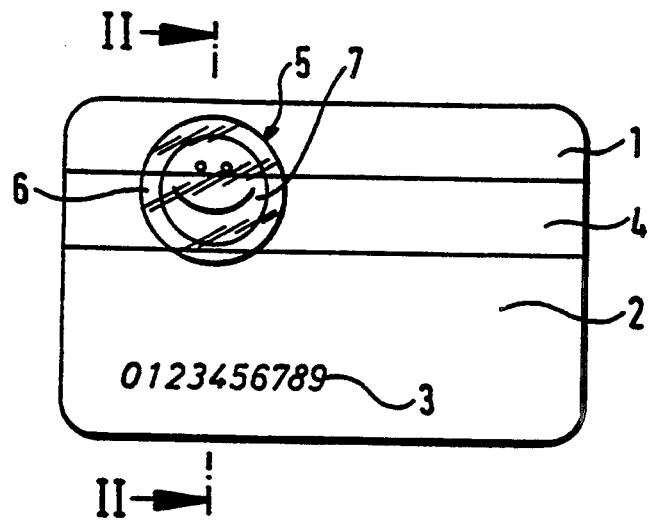
FIG. 1 is a plan view of a credit card with a security feature according to the invention.

Referring firstly to FIG. 1, shown therein is a value document according to the invention in the form of a credit card comprising a conventional plastic card 1 which on its front face carries for example in embossed letters the name 2 of the card holder, and an identification number as indicated at 3. The plastic card 1 is also provided on its front face with a security element or feature which includes on the one hand a magnetic strip 4 extending over the entire width of the card and on the other hand an optical security feature 5 which, as FIGS. 1 and 2 clearly show, is partially superimposed on the magnetic strip 4 but which in part also projects beyond the magnetic strip 4, projecting upwardly in FIG. 1 and to the left in FIG. 2.

Figure 2:
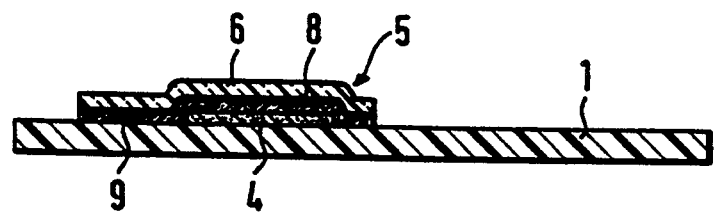
FIG. 2 is a view in section taken along line II—II through the credit card shown in FIG. 1.

The optical security feature 5 is for example of a configuration in accordance with the security feature described in above-mentioned U.S. Pat. No. 4,684,795. It comprises a transparent security layer 6 which has an optical effect and which is provided at least in a region-wise manner (in the inner region in FIG. 1) and at its underside with a structure 7 which has an optical-diffraction effect. At least in the region of the structure 7, the security layer 6 which has an optical-diffraction effect is provided with a metal layer 8 which is applied for example to the structure 7 of the security layer 6 by vapor deposition in a vacuum. In that respect the value document shown in FIGS. 1 and 2 is substantially the same as that described in above-mentioned U.S. Pat. No. 4,684,795.

Now, in the document shown in FIGS. 1 and 2, provided between the magnetic layer 4 and the metal layer 8 is a barrier layer which is indicated at 9 and which may be for example of a thickness of between 0.5 and 5

μm, preferably being between 2 and 3 μm. The purpose of the barrier layer 9 is to prevent the magnetic pigments which are present in the magnetic layer 4 and which are usually iron oxides from having an effect on the metal layer 8. In regard to possible compositions of the barrier layer 9 and the further layers of the value document or credit card shown in FIGS. 1 and 2, reference will be made to the following description in greater detail of the embossing foil shown in FIG. 3.

Instead of applying a barrier layer 9, it is also possible for the metal layer 8 to be made from a metal which does not react with the magnetisable particles of the magnetic layer 4, such a metal being for example chromium, copper, silver, gold or an alloy of at least two of those metals. It will be appreciated that it is possible both for the barrier layer 9 to be provided and for the metal layer 8 to be made from a metal which does not react with the magnetisable particles of the magnetic layer 4, as just referred to above.

The various layers of the document or credit card shown in FIGS. 1 and 2 can be applied in various ways. For example, it is possible for the magnetic layer 4 first to be applied to the plastic card 1 and then for the barrier layer 9 to be applied, for example by a printing operation. Then, if the barrier layer 9 comprises a suitable material, it may be covered, possibly only partially, by a metal layer 8 which is produced by a per se known vapor deposition procedure. Subsequently, the spatial structure must then be produced in the region of the metal layer 8. It will be appreciated that it is equally possible for the spatial structure to have been already formed prior to the operation of applying the metal layer by vapor deposition. Finally, the security layer 6 is then applied, for example also by means of a printing operation.

Figure 3:
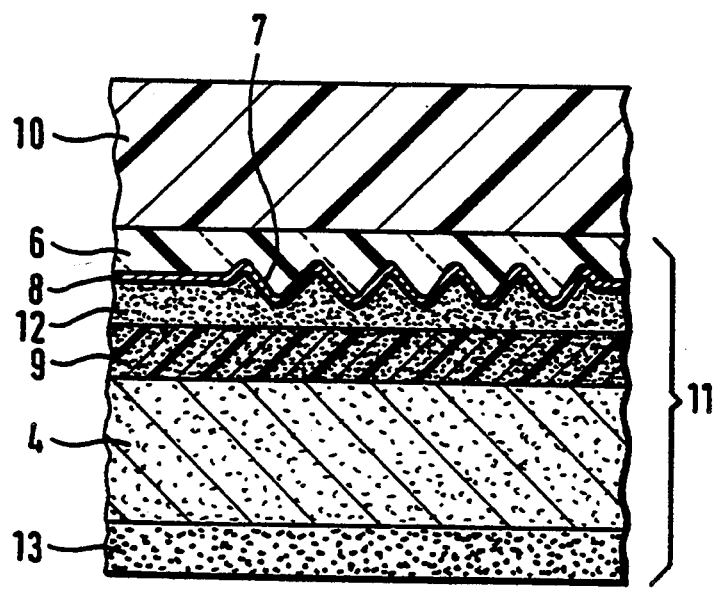
FIG. 3 is a broken-away diagrammatic view in section through a hot embossing foil.

It will be noted that a value document as shown in FIGS. 1 and 2 can be produced in a substantially simpler fashion if all the layers, namely the magnetic layer 4, the barrier layer 9, the metal layer 8 and the protective layer 6 are applied in one working operation by means of an embossing foil as shown in FIG. 3. In theory it is also possible to use two separate embossing foils of which one includes essentially only the magnetic layer while the other includes the barrier layer, the metal layer and the protective or security layer 6. It would be necessary to proceed in that way for example when producing the credit card shown in FIG. 1 by means of embossing foils.

Reference is now made to FIG. 3 showing a diagrammatic view of a portion of an embossing foil which is suitable for applying the entire security feature, that is to say both for applying the magnetic layer 4 and also for applying the security protective layer 6, with the reflective metal layer 8, in one step.

Looking therefore at FIG. 3, the foil shown therein comprises in per se known manner a carrier or backing film 10. A transfer layer which is generally identified by reference numeral 11 is arranged on the backing film 10, for example by way of a release layer (not shown) which preferably comprises a material such as wax to facilitate release of the transfer layer 11 from the backing film 10. Starting from the backing film 10, the transfer layer comprises a transparent cover layer 6 of lacquer which serves as a security layer with an optical-diffraction effect. At its surface which faces away from the backing film 10, being therefore the surface which faces downwardly in FIG. 3, the lacquer layer 6 is spatially structured at least in a region-wise manner in such a way that it can produce optical-diffraction effects. For example the security layer 6 is provided with a structure as indicated at 7 in the form of a hologram or a computer-generated diffraction structure, an interference layer or a diffraction grating. The structure 7 is generally impressed into the security lacquer layer 6 which is applied to the backing film 10. The lacquer which forms the layer 6 is here either a thermoplastic lacquer or a cross-linking lacquer which may still not be completely cured at the time at which the structure 7 is impressed therein.

Then, a metal layer 8 is applied to the surface of the layer 6 which bears the structure 7, in a vacuum, for example by a vapor deposit operation. In order to ensure that the further layers reliably adhere to the reflective metal layer 8, a bonding layer 12 is applied to the metal layer 8 before the subsequent further layer is applied. The bonding layer 12 is then followed by the barrier layer 9, the magnetic layer 4 and an adhesive layer 13 which serves to fix the transfer layer 11 on a substrate (not shown). It will be noted in this respect that the adhesive layer 13 can also be omitted if the magnetic layer 4 is of suitable properties in that respect.

Regarding FIG. 3, it should also be pointed out that the layers of the respective thicknesses are not shown in such a fashion as to be true to scale, in FIG. 3. In normal circumstances, the security layer 6 is of a thickness of between about 0.3 and 1.2 μm. The metal layer 8 comprising for example chromium, copper, silver, gold or an alloy or alloys thereof is applied by vapor deposition in a vacuum in per se known manner and is typically between about 0.01 and 0.04 μm in thickness. The bonding layer 12 is usually applied in a thickness of between about 0.2 and 0.7 μm. As already mentioned above, the barrier layer 9 is between about 0.5 and 5 μm in thickness while the magnetic layer 8 is usually between about 4 and 12 μm in thickness, preferably being about 9 μm. The thickness of the adhesive layer 13 approximately corresponds to the thickness of the security layer 6.

The various layers are applied by the procedures which are known from the production of embossing foils, as are described for example in above-mentioned DE 34 22 910 Cl. In that respect, the backing film 10 may be for example a polyester foil which is between about 19 and 23 μm in thickness and to which the various layers are then successively applied by means of intaglio printing rollers. After each of the individual layers has been applied, the necessary drying operation is effected. The spatial structure 7 of the security layer 6 is produced either by means of a rotating embossing cylinder or by a stroke embossing process.

EXAMPLES

Set out below are examples of the compositions of the various layers of the embossing foil shown in FIG. 3:

Protective lacquer or security layer 6:

| Components | Parts by weight |
| --- | --- |
| High-molecular PMMA-resin | 2 000 |
| Silicone alkyd, oil-free | 300 |
| Non-ionic wetting agent | 50 |
| Methylethylketone | 750 |
| Low-viscosity nitrocellulose | 12 000 |
| Toluene | 2 000 |
| Diacetone alcohol | 2 500 |

Metal layer 8:

Layer applied by vapor deposition in a vacuum and comprising chromium, copper, silver or gold or at least an alloy thereof.

| Components | Parts by weight |
|---|---|
| Bonding layer: | |
| High-molecular PMMA-resin | 1 200 |
| Methylethylketone | 3 400 |
| Toluene | 1 000 |
| Matting agent | 100 |
| Barrier layer 9: | |
| Methylethyleketone | 30 |
| Toluene | 35 |
| Ethyl alcohol | 15 |
| Vinylchloride-vinylacetate copolymer (MP: >65° C.) | 11 |
| Unsaturated polyester resin (MP: 100° C., d = 1.24 g/cm3) | 3 |
| Silicone polyester resin (d = 1.18 g/cm$^3$) | 2 |
| Hydrophobised silica (pH $\geq$7 of a 5% slurry in H$_2$O) | 4 |

Magnetic layer 4:

This comprises a dispersion of needle-shaped $\gamma$-Fe$_2$O$_3$-magnet pigment in a polyurethane binder, various lacquer additives and a solvent mixture comprising methylethylketone and tetrahydrofuran.

The magnetic layer however does not necessarily have to be of that composition. Instead of the Fe$_2$O$_3$-pigments, it would also be possible for example to use other magnet pigments, for example Co-doped magnetic iron oxides or other finely dispersed magnetic materials (Sr, Ba-ferrite). The binder combination of the magnetic layer can possibly also be so selected that it is possible to omit the bonding layer 12 because there is good adhesion directly to the metal 8, which can be of significance when the barrier layer is omitted.

Adhesive layer 13:

The layer 13 may be for example a per se known hot adhesive layer. However it is not always necessary for that layer to be applied. That question depends on the composition of the substrate on to which the embossing foil is to be embossed. If for example the substrate comprises PVC, as is generally the case with credit cards, it is then normally possible to omit a particular hot adhesive layer.

For the purposes of applying the embossing foil as shown in FIG. 3, it is laid, with the transfer layer 11 leading, on to the plastic card 1 or another document which is to be correspondingly safeguarded, and then pressed against that card or document, under the effect of heat. In that situation, on the one hand, the transfer layer 11 is joined to the corresponding surface of the document to be safeguarded, by way of the adhesive layer 13 or the correspondingly adhesive magnetic layer 4. On the other hand, as a result of the effect of the heat applied, the transfer layer 11 is released from the backing film 10. That release is particularly facilitated if there is an additional wax-like release or separation layer between the transfer layer 11 and the backing film 10.

It will be appreciated that the above-described documents and procedures and compositions have been set forth solely by way of example and illustration of the principles of the present invention and that various modifications and alterations may be made therein without thereby departing from the spirit and scope of the invention.

What is claimed is:

1. A value document comprising a surface carrying a security element including a magnetic layer comprising a dispersion of magnetizable particles in a binder and a security layer including an optical diffraction effect, said security layer overlying said magnetic layer in a region-wise manner with a surface of said security layer towards said magnetic layer having a spacial structure with an optical diffraction effect; a reflective non-magnetizable metal layer on said surface of said security layer; and a barrier layer between said metal layer and said magnetic layer, said barrier layer preventing said particles of said magnetic layer from reacting with said metal layer.

2. The value document as set forth in claim 1 wherein said barrier layer is comprised of an organic polymer and added inorganic pigment.

3. The value document as set forth in claim 1 wherein said barrier layer has a pH value of $\geq$7.

4. The value document as set forth in claim 1 wherein said barrier layer is of a thickness between about 0.5 and 5 $\mu$m.

5. The value document as set forth in claim 4 wherein said thickness of said barrier layer is between about 2 and 3 $\mu$m.

6. A value document comprising a surface carrying a security element including a magnetic layer comprising a dispersion of magnetizable particles in a binder and a security layer having an optical diffraction effect, said security layer overlying said magnetic layer in a region-wise manner said surface of said security layer towards said magnetic layer having a spacial structure with an optical diffraction effect; a reflective non-magnetizable metal layer on said surface of said security layer, said metal layer comprising a metal unreactive with said particles of said magnetic layer; and a barrier layer between said metal layer and said magnetic layer, said barrier layer restricting said particles of said magnetic layer from having an action on said metal layer.

7. The value document as set forth in claim 6 wherein said metal layer comprises a metal selected from the group constituted by chromium, copper, silver, gold or alloys comprising at least two of said metals.

8. The value document as set forth in claim 6 wherein said barrier layer is a layer of an organic polymer and added inorganic pigment.

9. The value document as set forth in claim 6 wherein said barrier layer has a pH value of $\geq$7.

10. The value document as set forth in claim 6 wherein said barrier layer is of a thickness of between 0.5 and 5 $\mu$m.

11. The value document as set forth in claim 10 wherein said thickness of said barrier layer is between 2 and 3 $\mu$m.

12. An embossing foil for the production of a value document comprising a backing film and a transfer layer which is releasable therefrom and which, starting from the backing film, comprises at least one transparent lacquer layer as a security layer, which lacquer layer has an optical-diffraction effect and at its surface remote from the backing film has a spatial structure with an optical-diffraction effect, a reflective metal layer over the spatial structure of the security layer, a magnetic layer comprising a dispersion of magnetisable particles in a binder, and an adhesive means for fixing to a substrate, wherein a barrier layer is disposed between the metal layer and the magnetic layer for preventing the particles of the magnetic layer from having an action on the metal layer.

13. An embossing foil as set forth in claim 12 wherein the barrier layer is a layer of at least one organic polymer to which at least one inorganic pigment is added.

14. An embossing foil as set forth in claim 12 wherein the barrier layer has a pH-value of $\geq 7$.

15. An embossing foil as set forth in claim 12 wherein the barrier layer is of a thickness of between about 0.5 and 5 µm.

16. An embossing foil as set forth in claim 15 wherein the thickness of the barrier layer is between about 2 and 3 µm.

17. An embossing foil as set forth in claim 12 wherein a bonding layer is provided between the metal layer and the barrier layer immediately adjoining the metal layer.

18. An embossing foil for the production of a value document comprising a backing film and a transfer layer which is releasable therefrom and which, starting from the backing film, comprises at least one transparent lacquer layer as a security layer, which lacquer layer has an optical-diffraction effect and at its surface remote from the backing film has a spatial structure with an optical-diffraction effect, a reflective metal layer over the spatial structure of the security layer, a magnetic layer comprising a dispersion of magnetisable particles in a binder, and an adhesive means for fixing to a substrate, wherein the metal layer comprises a metal which is at least substantially unreactive with the particles of the magnetic layer and wherein a barrier layer is arranged between the metal layer and the magnetic layer for at least restricting the action of the particles of the magnetic layer on the metal layer.

19. An embossing foil as set forth in claim 18 wherein said adhesive means comprises an adhesive layer.

20. An embossing foil as set forth in claim 18 wherein said adhesive means is formed by said magnetic layer.

21. An embossing foil as set forth in claim 18 wherein said adhesive means is combined with said magnetic layer.

* * * * *